April 27, 1943.   G. KENDE ET AL   2,317,465
CAMERA
Filed Sept. 12, 1939   2 Sheets-Sheet 1

INVENTORS
George Kende and Otto K. Cazin
BY
ATTORNEY

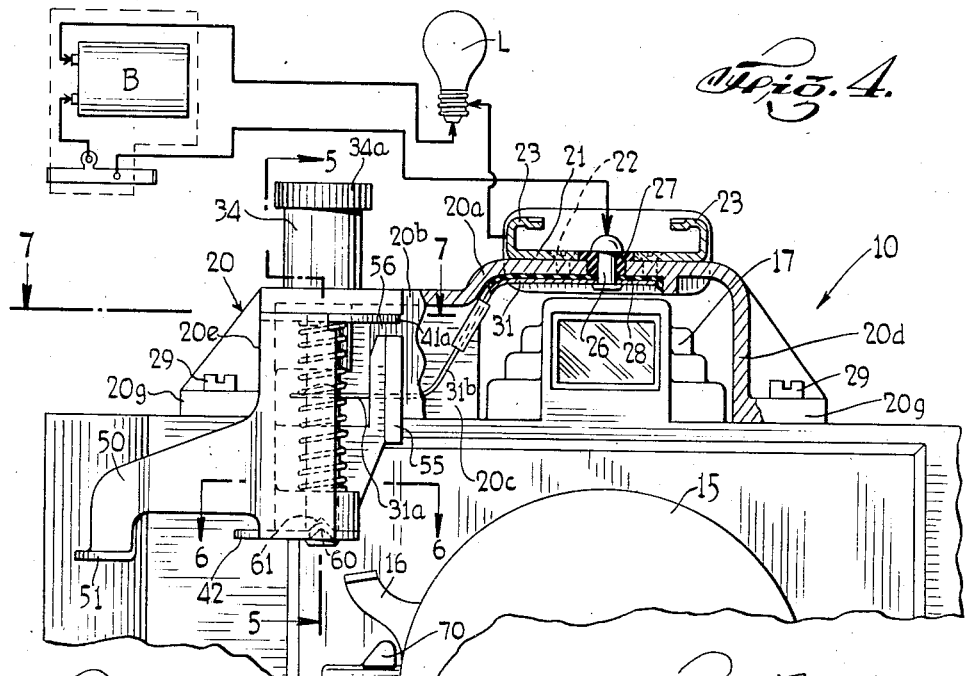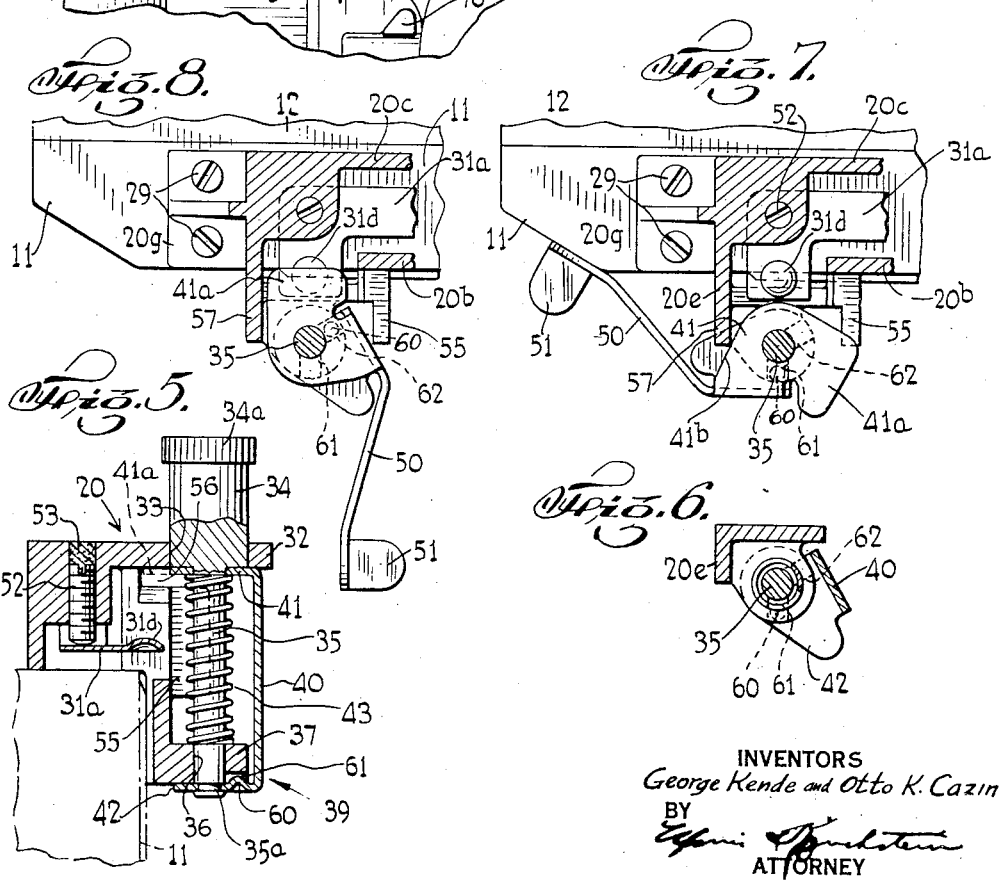

Patented Apr. 27, 1943

2,317,465

UNITED STATES PATENT OFFICE 2,317,465

CAMERA

George Kende, New York, N. Y., and Otto K. Caxin, Hoboken, N. J., assignors to Universal Camera Corporation, New York, N. Y., a corporation of Delaware Application September 12, 1939, Serial No. 294,442

11 Claims. (Cl. 67—29)

This invention relates to cameras. More particularly, our invention relates to a novel camera construction designed for cooperative use with a suitable photo-flash unit.

One of the objects of our invention is to provide a novel and improved release button mechanism mounted on the body of a camera and adapted to operate a shutter mounted on an extension.

Another object of our invention is to provide a novel and improved photo-flash synchronizing mechanism adapted to be attached to a camera, and which shall be designed so that it will at the same time serve as a shutter actuating device.

Another object of our invention is to provide a novel and improved photo-flash synchronizing mechanism of the character described, adapted to have a suitable photo-flash unit attached thereto in such manner whereby electrical contact between said photo-flash unit and said photo-flash synchronizing mechanism may be automatically effected at the instant when the shutter is fully open.

A further object of our invention is to provide a novel and improved photo-flash synchronizing mechanism adapted to be attached to a camera and designed to serve as a shutter actuating device, which shall be designed for cooperative use with a suitable photo-flash unit, and which shall be so constructed as to prevent the actuation of the photo-flash bulb at all times except when the said device is in effective shutter operating position and when the camera is in picture taking position.

A still further object of our invention is to provide a photo-flash synchronizing mechanism adapted to be attached to a camera which shall be characterized by its simplicity of construction and by its high degree of efficiency in operation.

Other objects of this invention will in part be obvious and in part hereinafter pointed out.

Certain features disclosed but not claimed in this application are described and claimed in the copending applications for Cameras, Serial No. 237,265, filed October 27, 1938, issued July 23, 1940, as United States Letters Patent No. 2,208,-797 and Serial No. 249,568, filed January 6, 1939, issued March 24, 1942, as United States Letters Patent No. 2,277,233.

The invention accordingly consists in the features of construction, combinations of elements and arrangement of parts which will be exemplified in the construction hereinafter described, and of which the scope of application will be indicated in the following claims.

In the accompanying drawings, in which is shown one of the various possible embodiments of this invention, Fig. 1 is a front elevational view of a camera provided with photo-flash synchronizing mechanism constructed in accordance with our invention and illustrating the manner of attaching a photo-flash unit thereto;

Fig. 4 is an enlarged view, partly in section and partly diagrammatic, of the photo-flash synchronizing mechanism as shown in Fig. 1;

Fig. 5 is a cross-sectional view taken substantially on the line 5—5 of Fig. 4;

Fig. 6 is a cross-sectional view taken substantially on the line 6—6 of Fig. 4;

Fig. 7 is a cross-sectional view taken substantially on the line 7—7 of Fig. 4; and Fig. 8 is a view similar to Fig. 7, but illustrating the shutter actuating device in effective position.

Figure 1:
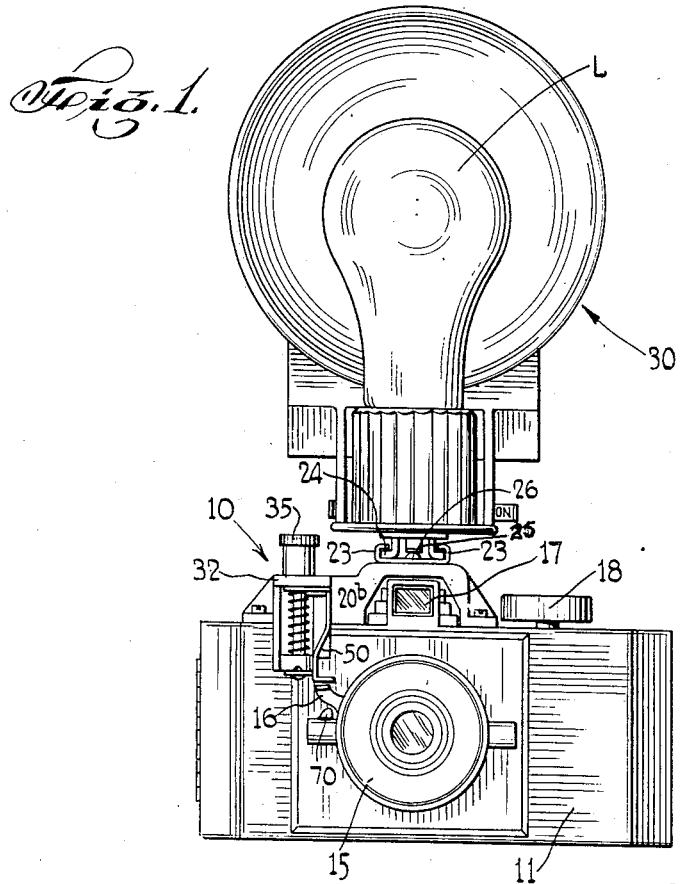

Referring now in detail to the drawings, there is disclosed photo-flash synchronizing mechanism 10 constructed in accordance with our invention and which may be designed to be attached to a camera provided with a manually operable button or lever for actuating the camera shutter. For the purpose of illustration, we have shown in the drawings a type of camera such as is disclosed in the hereinbefore mentioned copending application, Serial No. 237,265, and which comprises a pair of hingedly connected casing parts 11 and 12. In the front casing part 11 is slidably mounted a lens tube 14 which is adapted to be outwardly projected from the dotted line position 15' in Fig. 3 to effective picture taking position, as shown in full lines in Figs. 2 and 3 of the drawings. At the forward end of the lens tube 14 is a shutter housing 15 carrying a shutter (not shown) and a manually operable lever 16 for actuating the shutter.

The said camera is also provided with a view finder 17 and a film spool winding knob 18 mounted on the top wall of the front casing part 11.

The photo-flash synchronism mechanism 10 comprises a supporting frame 20 which may be die cast as a single unit and which may be of the same metallic material as and finished to correspond to the casing parts 11 and 12. The frame 20 comprises a top wall 20a, front and rear walls 20b and 20c respectively depending therefrom, and end walls 20d and 20e. The side wall 20d is made of sufficient height so that the top wall 20a will clear the camera view finder 17. The frame 20 is adapted to be attached to the camera by a pair of flanges 20g extending from the end walls 20d and 20e, the said flange overlying the top wall of the casing part 11. Screws 29 are employed for fastening the frame 20 to the camera. Rigidly mounted on the top frame wall 20a by means of the screws 22 is a clip member 21 of metallic material, having channeled guides 23 and adapted to receive therein the correspondingly shaped flanged attaching members 24 of a photo-flash unit 30.

While in the drawings there is illustrated a type of photo-flash unit such as fully shown and described in the copending application, Serial No. 249,568, filed January 6, 1939, for Cameras, it is understood that our novel photo-flash synchronizing mechanism may be satisfactorily employed with other similar types of photo-flash units, and that our invention extends to such use.

As noted in the diagrammatic wiring diagram of Fig. 4, one terminal of the battery B, housed in the photo-flash unit, is electrically connected to the metallic clip 21 through the flash lamp L. The other terminal of the battery is connected to a resilient contact member 25 carried by the photo-flash unit and which is designed to make electrical contact with the enlarged head portion of a contact rivet 26 projecting slightly above the bottom wall of the clip 21, between the guides 23. The rivet 26 is insulated from the metallic clip 21 and the adjacent metallic top wall 20a of the frame 20 by an insulating collar 27 and an insulating washer member 28 contactively overlying the under surface of the top wall 20a.

In order to provide accurate and automatic synchronization between the energization of the flash bulb L and the instant when the camera shutter is fully open, the following mechanism is provided.

A contact member 31 made of electrical conductive material, such as copper, is firmly attached at one end thereof to the frame wall 20a by the contact rivet 26. The member 31 is provided with a portion 31a parallel to and at a lower level than the main portion 31 and is integrally interconnected by an angularly disposed portion 31b. It is noted that the main member portion 31 is electrically connected to the rivet 26, but is insulated from the frame wall 20a by the washer 28, while the free portions 31a and 31 are freely received between the front and rear frame walls 20b and 20c.

It is thus seen from the above description that in order to complete the circuit to energize the flash bulb L, it is necessary to complete the electrical connection between the member 31 and the clip 21. This is done through the metallic frame 20 in the following manner.

In an extending portion 32 of the top wall 20a there is provided an aperture 33 in which is snugly received a sliding button 34 having an enlarged head portion 34a to limit the downward movement of the button 34. The button 34 is also rotatable in the aperture 33 and is provided with a depending shaft portion 35 of reduced diameter and having a portion adjacent the lower end thereof adapted to be slidably and rotatably received in an aperture 36 in a lower auxiliary wall portion 37 of the frame 23. It is noted that the apertures 33 and 36 are in axial alignment and that the lower wall portion 37 is parallel to the upper wall portion 32.

To limit the distance of the upward travel of the push button 34 and for the purpose of making electrical contact with the member 31, there is provided a metallic bracket member 39 comprising a vertical portion 40 parallel to and spaced from the shaft 35, and upper and lower flanges 41 and 42 respectively, integral with the portion 40. The flanges 41 and 42 are rigidly attached to the shaft 35 for integral movement. It is noted that when the push button 34 is in its uppermost position, as in Fig. 5 of the drawings, the flange 41 will abut the under surface of the wall portion 32 and the lower flange 42 will abut the under surface of the lower wall 37, to limit the upward travel of the button 34. The lower end of the shaft 35 may be provided with a portion 35a of reduced diameter, the said portion 35a passing through an aperture in the flange 42 and riveted over, as clearly shown in Fig. 5. A coil spring 43 surrounding the shaft 35 and interposed between the lower wall 37 and the upper flange 41 serves to maintain the push button 34 in its uppermost position.

Figures 2, 3:
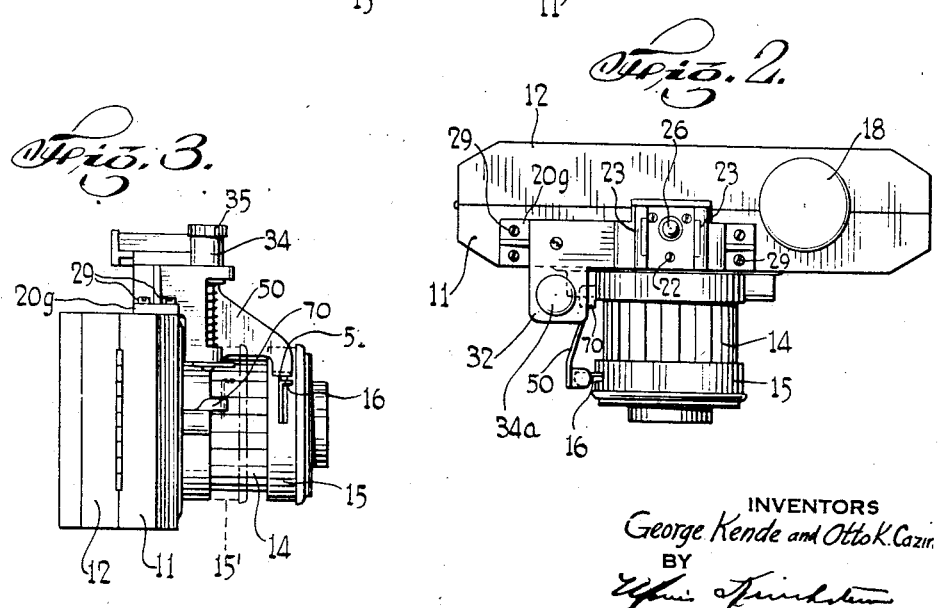
Figs. 2 and 3 are top plan and end views thereof respectively, but with the photo-flash unit removed.

The upper flange 41 is provided with an integral projecting portion 41a which is so constructed and arranged that when the bracket 39 is rotated in a counterclockwise direction from the position shown in Fig. 4, to the position shown in Figs. 1, 2 and 8, and the push button 34 moved downwardly against the action of the spring 43, the said portion 41a will contactively engage the member portion 31a to complete the electrical circuit through the frame 20 via the metallic bracket 39, the shaft 35, at the point 35a, and the push button 34, to energize the flash bulb L. The contact member portion 31a may be provided with an upwardly pressed projection 31d to insure better electrical contact with the upper flange portion 41a.

To synchronize the energization of the flash bulb L with the operation of the shutter, there is provided a shutter trip arm 50 projecting from the bracket portion 40 and having a flattened flange 51 so arranged that when the bracket 39 has been rotated to its effective position, as shown in Fig. 8, the flange 51 will lie directly above the shutter lever 16 of the camera, as shown in Fig. 1. The distance between the upper flange portion 41a and the member portion 31a is such that they will contactively engage at the instant when the flange 51 has actuated the lever 16 to fully open the shutter. The member portion 31a is maintained in such proper distance by an abutment member, which may be in the form of a screw 52 of insulating material threadedly mounted in the frame 20, as shown in Figs. 5, 7 and 8, the said member portion 31a being designed to resiliently engage the abutment screw 52. In order to prevent tampering with the abutment member 52 after it has been accurately adjusted, the said screw 52 is made smaller in length than the opening in the frame 20, and the space between the top of the said screw 52 and the top surface of the frame is filled in with any suitable plastic material 53.

In accordance with our invention, we have also provided means for preventing the energization of the flash bulb L, unless at the same time the camera shutter is actuated. To this end, the frame 20 is provided with an abutment wall 55 parallel to and spaced from the end wall 20e a predetermined distance. It is noted that a slotted space 56 (see Fig. 4) is provided between the top edge of the wall 55 and the top wall portion 32. This space 56 is of sufficient size to permit the flange portion 41a of the bracket 39 to freely pass therein. It is therefore seen from the above description that when the arm 50 is rotated in a clockwise direction away from its effective shutter actuating position, the projecting flange portion will be received within the space 56, to thereby prevent downward movement of the button 34, as clearly shown in Figs. 4 and 7, and thus prevent completion of the circuit which is necessary in order to energize the flash bulb L.

The clockwise rotational movement of the arm 50 is limited by an extending portion 57 of the end wall 20e, which acts as an abutment for the upper flange edge 41b, as shown in Fig. 7. The same wall portion 57 also serves as an abutment for the edge of the upper flange portion 41a, to limit the counter-clockwise rotational movement of the arm 50, as shown in Fig. 8.

To releasably retain the arm 50 in its effective shutter actuating position, the bottom flange 42 is provided with an upwardly pressed projection 60 adapted to be received in a corresponding detent 61 in the lower wall 37. A second detent 62 (see Figs. 4 and 7) is also provided in the lower wall 37 to maintain the arm 50 in the limit of its ineffective position, as shown in Fig. 4.

As hereinbefore explained, the camera to which the photo-flash mechanism is attached is of the type which has an extensible lens tube 14 for projecting the lens and shutter, and therefore it is essential that the photo-flash bulb be prevented from energization when the lens tube is in its innermost position, the position shown by the dotted line 15' in Fig. 3 of the drawings. To this end, we have provided the front casing part of the camera with an outwardly projecting lug 70, so positioned with respect to the shutter lever 16 that it will act as a rigid stop to prevent downward movement of the said lever 16 whenever the lens tube is in its innermost position. Therefore, with the lens tube 14 of the camera in its innermost position, should the arm 50 of the bracket 39 be rotated to effective position to release the upper flange portion 41a from the slotted space 56, so as to permit downward movement of the button 34, the bottom flange 42 will strike the lever 16 and, because of the stop 70, will be prevented from further downward movement, and thus prevent the upper flange 41a from contacting the member portion 31. The result will be that the camera shutter will not be actuated, and the photo-flash bulb will not be energized. However, when the lens tube is projected to picture taking position, the lever 16 will be moved clear of the stop member 70 and the shutter may be effectively actuated in synchronism with the photo-flash bulb.

While in the drawings we have shown, and in the description we have described our novel release button mechanism as employed in cooperative use with a camera having a photo-flash synchronizing device, it is to be understood that the said release button mechanism may also be used in cameras which do not have photo-flash synchronizers and that our invention extends to such use.

It is also noted that the present application is not to be interpreted as limited to a construction in which the frame 20 and the release button 34 are of electrically conductive material. A suitable variation of the mechanism shown in the drawings, in which the movement of the button 34 is caused to bring together two contacts of electrically conductive material to complete a suitably arranged circuit to the battery B of the photo-flash device, may also be employed in accordance with our invention. In such construction the button 34 and the frame 20 need not be made of electrically conductive material.

It will thus be seen that there is provided a device in which the several objects of this invention are achieved, and which is well adapted to meet the conditions of practical use.

As various possible embodiments might be made in the above invention, and as various changes might be made in the embodiment above set forth, it is to be understood that all matter herein set forth or shown in the accompanying drawings is to be interpreted as illustrative and not in a limiting sense.

Having thus described our invention, we claim as new and desire to secure by Letters Patent:

1. In a camera of the type having a projectible shutter housing and a shutter lever movable with said housing, photo-flash mechanism comprising a button, a frame, means for mounting said button on said frame for axial movement, said last named means including means for mounting said button for rotational movement between two positions, means to prevent axial movement of said button when it is at one of said positions, means to prevent axial movement of said button when it is at the other of said positions and said shutter housing is in its inward non-picture taking position, said last named means being rendered ineffective when said shutter housing is in its outwardly projected picture taking position, a shutter trip arm mounted on said button for integral movement therewith, an electrical contact member associated with said button and an electrical contact member associated with said frame, said contacts being electrically connected to a photoflash unit and normally spaced from each other, said arm being adapted to actuate said shutter lever, and said contact members being brought into abutment upon movement of said button when said shutter housing is in its outwardly projected picture taking position and said button is at said other position.

2. For use with a camera having a shutter lever which has an actuable and a non-actuable position, a photo-flash mechanism comprising a button, a frame, means for mounting said button on said frame for axial movement, said last named means including means for mounting said button for rotational movement between two positions, means to prevent axial movement of said button when it is at one of said positions, means to prevent axial movement of said button when it is at the other of said positions and said shutter lever is in non-actuable position, means to render said last named means ineffective when said shutter lever is in actuable position, a shutter trip arm mounted on said button for integral movement therewith, an electrical contact member associated with said button, and an electrical contact member associated with said frame, said contacts being electrically connected to a photoflash unit and normally spaced from each other, said arm being adapted to actuate said shutter lever and said contact members being brought into abutment upon axial movement of said button when it is in said other position.

3. For use with a camera having a shutter lever which has an actuable and a non-actuable position, a photo-flash mechanism comprising a button, a frame, means for mounting said button on said frame for axial movement, said last named means including means for mounting said button for rotational movement between two positions, means to prevent axial movement of said button when it is at one of said positions, means to prevent axial movement of said button when it is at the other of said positions and said shutter lever is in non-actuable position, means to render said last named means ineffective when said shutter lever is in actuable position, a shutter trip arm mounted on said button for integral movement therewith, electrical switch means associated with said button and adapted upon closing to complete a circuit supplying current to a photo-flash unit, said arm being adapted to actuate said shutter lever and to close said electrical switch means upon axial movement of said button when it is in said other position.

4. For use with a camera having a shutter lever, a photo-flash mechanism comprising a button, a frame, means for mounting said button on said frame for axial movement, said last named means including means for mounting said button for rotational movement between two positions, means to prevent axial movement of said button when it is at one of said positions, a shutter trip arm mounted on said button for integral movement therewith, the actuating portion of said shutter trip arm being radially spaced from the axis of said button, said actuating portion and said shutter lever being operatively disaligned when said button is at said one rotational position, and being operatively aligned when said button is at the other rotational position, an electrical contact member associated with said button, and an electrical contact member associated with said frame, said contacts being electrically connected to a photo-flash unit and normally spaced from each other, said contact members being brought into abutment upon axial movement of said button when it is at the other of said positions.

5. For use with a camera having a shutter lever, a photo flash mechanism comprising a button, a frame, means for mounting said button on said frame for axial movement, said last named means including means for mounting said button for rotational movement between two positions, means to prevent axial movement of said button when it is at one of said positions, a shutter trip arm mounted on said button for integral movement therewith, the actuating portion of said shutter trip arm being radially spaced from the axis of said button, said actuating portion and said shutter lever being operatively disaligned when said button is at said one rotational position, and being operatively aligned when said button is at the other rotational position, an electrical contact member associated with said button, and an electrical contact member associated with said frame, said contacts being electrically connected to a photo-flash unit and normally spaced from each other, said contacts being operatively disaligned when said button is at said one rotational position and being operatively aligned when said button is at said other rotational position, whereby axial movement of said button when in said other rotational position will actuate said shutter and bring said contact members into abutment.

6. For use with a camera having a shutter lever, an auxiliary photo-flash mechanism adapted to be mounted on said camera, said photo-flash mechanism comprising a button, a frame, a clip on said frame for detachably holding a photo-flash unit, said clip including a pair of electrically insulated contact portions adapted to be electrically connected to said photo-flash unit, said frame being of electrically conductive material and being electrically connected to one of the contact portions of said clip, an electrical contact member mounted on said frame and having a portion thereof electrically connected to the other of the contact portions of said clip, said electrical contact member being insulated from said frame, means movable with said button and cooperating with said contact member to close the portion of the electric circuit for said photo-flash unit which is in said photo-flash mechanism, and means movable with said button to actuate said shutter lever when said portion of said electric circuit is closed.

7. For use with a camera having a shutter lever, an auxiliary photo-flash mechanism adapted to be mounted on said camera, said photo-flash mechanism comprising a button, a frame, a clip on said frame for detachably holding a photo-flash unit, said clip including a pair of electrically insulated contact portions adapted to be electrically connected to said photo-flash unit, said frame being of electrically conductive material and being electrically connected to one of the contact portions of said clip, an electrical contact member mounted on said frame and having a portion thereof electrically connected to the other of the contact portions of said clip, said electrical contact member being insulated from said frame, a second electrical contact member fixedly mounted on said button, said first electrical contact member lying in the path of travel of said second electrical contact member, and means movable with said button to actuate said shutter lever when said contact members are abutted.

8. For use with a camera having a shutter lever, an auxiliary photo-flash mechanism adapted to be mounted on said camera, said photo-flash mechanism comprising a button, a frame, a clip on said frame for detachably holding a photo-flash unit, said clip including a pair of electrically insulated contact portions adapted to be electrically connected to said photo-flash unit, said frame being of electrically conductive material and being electrically connected to one of the contact portions of said clip, an electrical contact member mounted on said frame and having a portion thereof electrically connected to the other of the contact portions of said clip, said electrical contact member being insulated from said frame, a second electrical contact member fixedly mounted on said button, said first electrical contact member lying in the path of travel of said second electrical contact member, and means associated with said button for effectively actuating said shutter lever, said last named means being so disposed with respect to said second electrical contact member that said shutter lever is actuated simultaneously with the abutment between said first and second electrical contact members.

9. For use with a camera having a shutter lever, an auxiliary photo-flash mechanism adapted to be mounted on said camera, said photo-flash mechanism comprising a button, a frame, means for mounting said button on said frame for axial movement, said last named means including means for mounting said button for rotational movement between two positions, means to prevent axial movement of said button when it is at one of said positions, a shutter trip arm mounted on said button for integral movement therewith, the actuating portion of said shutter trip arm being radially spaced from the axis of said button, said actuating portion and said shutter lever being operatively disaligned when said button is at said one rotational position, and being operatively aligned when said button is at the other rotational position, a first electrical contact member associated with said button, a second electrical contact member associated with said frame, and a clip on said frame for detachably holding a photo-flash unit, said clip including a pair of electrical contact portions, one of which is electrically insulated from said frame, said contact portion being adapted to be electrically connected to said photo-flash unit, said second electrical contact member being electrically connected to said insulated contact portion of said clip and being electrically insulated from said frame, said first and second contact members being normally spaced from each other, said contact members being brought into abutment upon movement of said button when said button is at the other of said positions.

10. For use with a camera having a shutter lever, an auxiliary photo-flash mechanism adapted to be mounted on said camera, said photo-flash mechanism comprising a button, a frame, means for mounting said button on said frame for axial movement, said last named means including means for mounting said button for rotational movement between two positions, means to prevent axial movement of said button when it is at one of said positions, a shutter trip arm mounted on said buton for integral movement therewith, the actuating portion of said shutter trip arm being radially spaced from the axis of said button, said actuating portion and said shutter lever being operatively disaligned when said button is at said one rotational position, and being operatively aligned when said button is at the other rotational position, a first electrical contact member associated with said button, a second electrical contact member associated with said frame, means comprising an abutment member threadably mounted in said frame for varying the relationship of said second contact member relative to said first contact member, the upper end of said abutment member being disposed below the upper surface of said frame, means to conceal said upper end of said abutment member after said frame contact member has been properly positioned as set forth, and a clip on said frame for detachably holding a photo-flash unit, said clip including a pair of electrical contact portions, one of which is electrically insulated from said frame, said contact portions being adapted to be electrically connected to said photo-flash unit, said second electrical contact member being electrically connected to said insulated contact portion of said clip and being electrically insulated from said frame, said first and second contact members being normally spaced from each other, said contact members being brought into abutment upon movement of said button when said button is at the other of said positions.

11. For use with a camera of the type having a projectible shutter housing and a shutter lever movable with said housing, a photo-flash mechanism adapted to be mounted on said camera, said photo-flash mechanism comprising a button, a frame, means for mounting said button on said frame for axial movement, said last named means including means for mounting said button for rotational movement between two positions, means to prevent axial movement of said button when it is at one of said positions, means to prevent axial movement of said button when it is at the other of said positions and said shutter housing is in its inward non-picture taking position, said last named means being rendered ineffective when said shutter housing is in its outwardly projected picture taking position, a shutter trip arm mounted on said button for integral movement therewith, a first electrical contact member associated with said button, a second electrical contact member associated with said frame, and a clip on said frame for detachably holding a photo-flash unit, said clip including a pair of electrical contact portions, one of which is electrically insulated from said frame, said contact portions being adapted to be electrically connected to said photo-flash unit, said second electrical contact member being electrically connected to said insulated contact portion of said clip and being electrically insulated from said frame, said contact members being normally spaced from each other, said shutter trip arm being adapted to actuate said shutter lever and to bring said contact members into abutment upon movement of said button when said shutter housing is in its outwardly projected picture taking position and said button is at said other position.

GEORGE KENDE.
OTTO K. CAZIN.